July 18, 1939.  E. BUGATTI  2,166,858
RAILWAY TRUCK
Filed Aug. 3, 1937  3 Sheets-Sheet 1

Inventor:-
Ettore Bugatti
By Mauro + Lewis
Attorneys

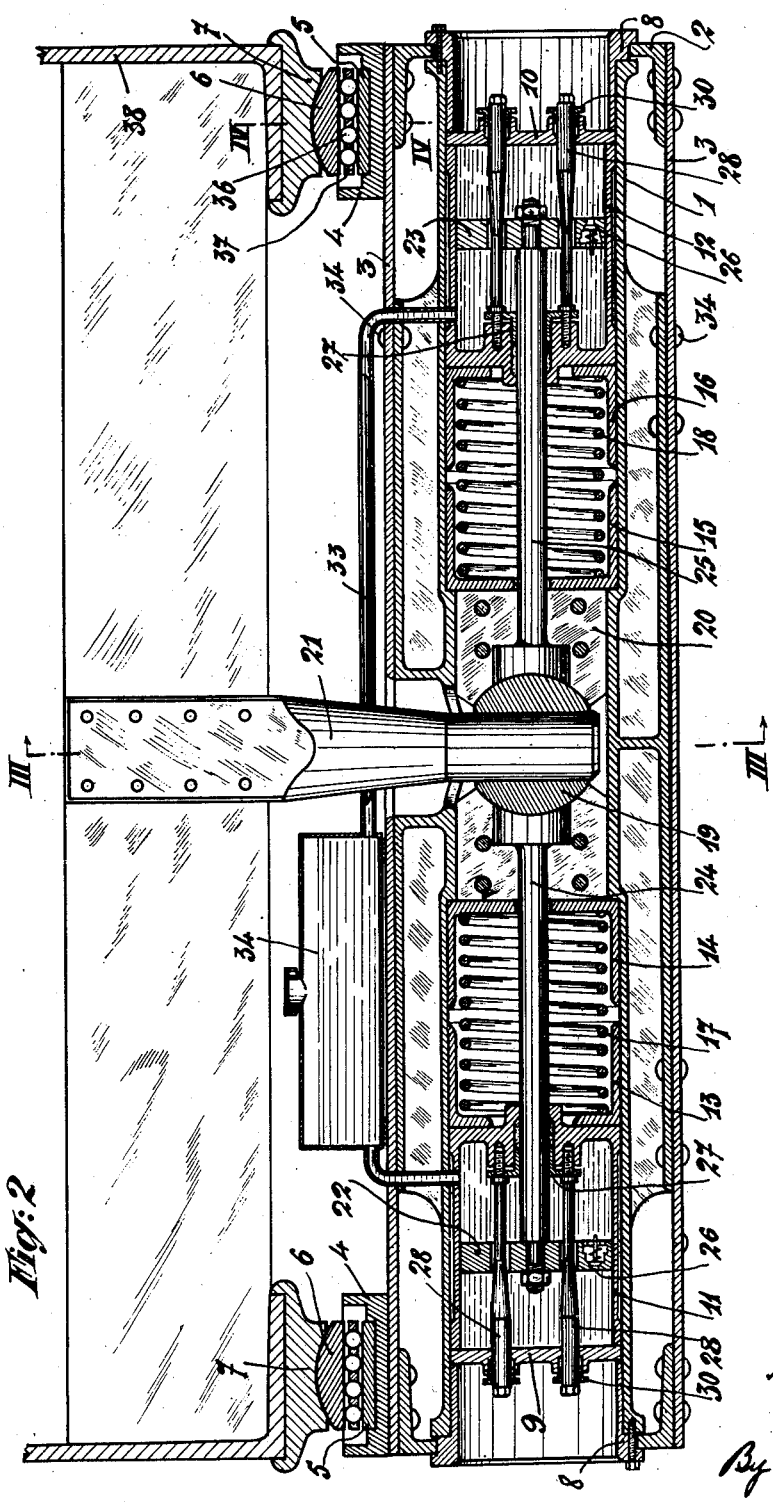

July 18, 1939.  E. BUGATTI  2,166,858
RAILWAY TRUCK
Filed Aug. 3, 1937   3 Sheets-Sheet 3
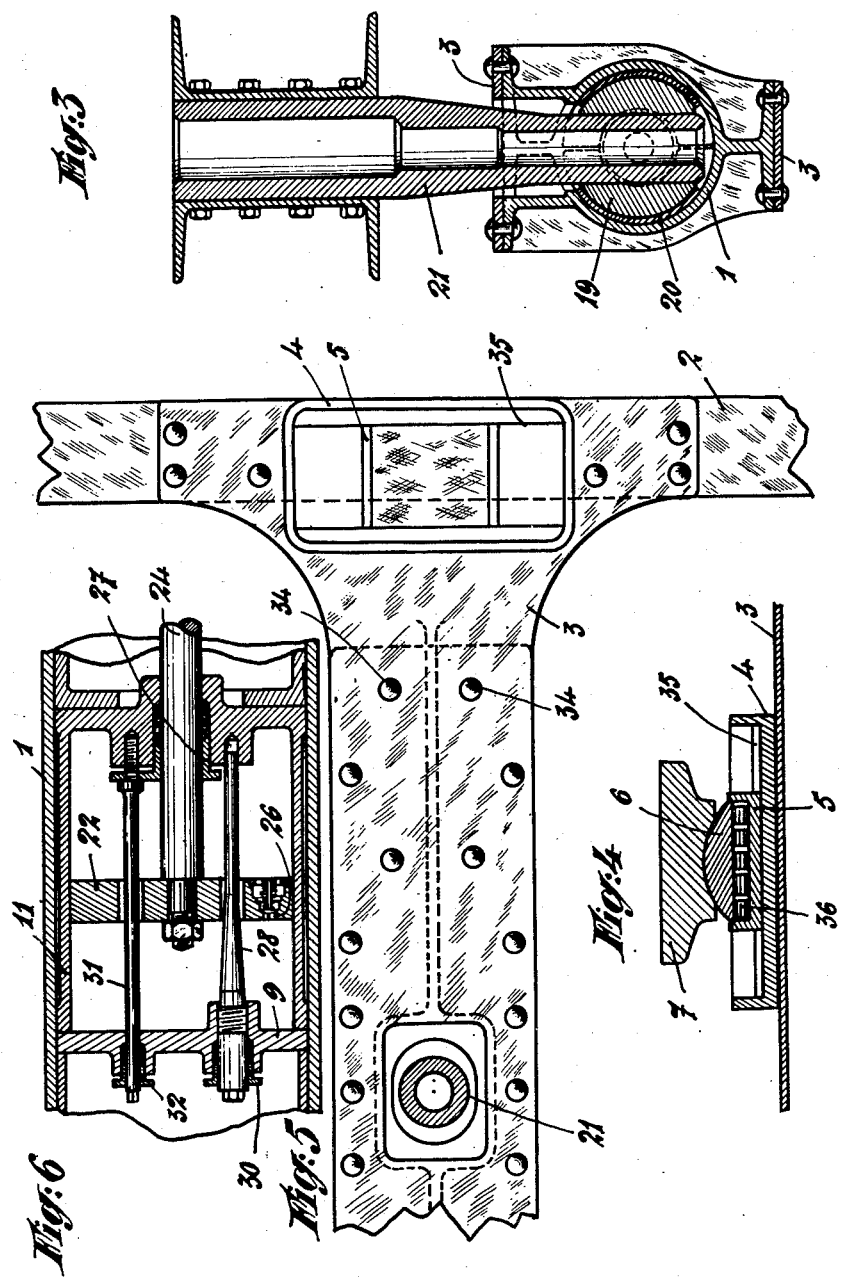

Patented July 18, 1939

2,166,858

UNITED STATES PATENT OFFICE 2,166,858

RAILWAY TRUCK

Ettore Bugatti, Molsheim, France

Application August 3, 1937, Serial No. 157,210
In France August 24, 1936

3 Claims. (Cl. 105—182)

It has already been proposed to build railway vehicle trucks which exhibit, in operation, an amount of flexibility. For instance, it is known to build railway trucks having a bolster located in the central part of the truck, which receives the load of the vehicle at both ends and distributes it to the wheels through pairs of longitudinal springs. The latter operate as resiliently flexible side frames rigid with the axle boxes at their ends and held in the bolster in their middle parts. The excessive flexibility of these two-axle trucks seems to limit the application thereof to light vehicles, the load per axle being relatively small. As a matter of fact, in the usual state of engineering, the two axle trucks of railway vehicles include a frame which is generally made of longitudinal elements interconnected by transverse elements, in such manner as to form a rigid whole. The construction of frames of a single block made of cast metal, which is relatively recent in the art, has been considered as an improvement of very high importance.

Despite the interposition of elastic elements between the axles and the rigid frame of a railway truck of this last mentioned type, said elastic elements consisting as a rule of coil springs interposed between the longitudinal members of the frame and longitudinal equalizing bars, shocks produced when the wheels run on unequalities of the track are transmitted to the frame of this truck and subject it to severe stresses.

These shocks may be bi-lateral, for instance, when the wheels of a truck axle pass over facing rail joints, but they may also be unilateral for instance when the rail joints on the rail stretches are arranged in staggered position so that one wheel passes over a joint while the other wheel on the same axle runs over a smooth rail portion. The truck is then subjected to disymmetric stresses and it will be readily understood how advantageous it would be to provide a railway truck capable of yielding elastically when such a shock occurs, while preserving an approximate rigidity sufficient for behaving under other circumstances of service in the same manner as an ordinary frame, that is to say differentiating from the very flexible truck mentioned in the beginning of this specification. A frame having this relative flexibility would then be less exposed to deterioration, even if it were lighter. It would also be advantageous by reason of the better capability of its wheels on any one side thereof to "stick" to the corresponding rail stretch, i. e. not to jump when running on the same in spite of any level defects.

An object of the present invention is to provide a truck which complies with the conditions above mentioned.

The essential feature of the truck according to the present invention is the following: its frame includes two longitudinal elements, either simple or composite, which are rigid individually and are connected to the frame by parts permitting a slight warping of the plane of their longitudinal axes, the truck being further provided, near the middle of its length, with resilient biassing means which tend to bring back the axes into the same plane. In a vehicle provided with a truck of this kind, the load is preferably transmitted exclusively to the longitudinal members or their equivalent.

The resilient biassing means may include a transverse member working like a torsion bar and, in particular, it may include one or two transverse gussets fixed, near their ends, to the longitudinal members or the like, and, in their central part only, to a transverse beam assembled to the longitudinal members for rotation therein, said beam preferably acting as means for connecting the vehicle body or the body frame with the truck through a king-bolt.

The flexible truck may also include a tubular transverse beam connecting the longitudinal members together in such manner as to permit the relative warping above referred to and positioned substantially to lie in the middle of the truck, resilient means being interposed between this beam and at least one of the longitudinal members, so as to urge them toward their normal position. In particular, the beam may be provided with bearings or journals engaging holes in the longitudinal members. One of the longitudinal members may be rigidly connected to said beam.

Said beam may include one or several arms which are connected to the longitudinal members through springs or equivalent means, such as rubber sleeves, torsional bars, and so on, which act as elastic return means. Conversely, the arms may be connected to the longitudinal members and the springs to the beam.

For practical purposes, the railway truck above described may include other improvements which although capable of being applied independently of the improvement above set forth for rendering the skeleton of the truck flexible, are combined with this improvement for ensuring a better running of such trucks and vehicles fitted with such trucks.

As it is well known, when a vehicle is running on a rail joint or a track apparatus, or when it is entering or leaving a curb, lateral shocks are produced which are the stronger as the vehicle is running at a higher speed. These shocks are all the more severe as the vehicle is lighter, and as less care is exercised to damp the shocks by providing adequate instrumentalities to this end between the wheels and the vehicle body. The foregoing consideration as well as other ones, explains why in railway vehicles, and especially automotive vehicles, speed increase is often acquired at the expense of the comfort.

Another object of the present invention is to provide a railway truck which obviates the drawback just above mentioned.

According to this feature, which is applied in a general manner to trucks in which the load of the body or chassis of the vehicle is transmitted to the truck through cooperating parts arranged for relative transverse movement, I combine means adapted to reduce the friction to a minimum, and this merely in the transverse direction, between the above mentioned parts, with a system for braking these displacements provided with return means for bringing back the parts to their mean position. Owing to these combined actions, the only obstacle to be considered for practical purposes from the point of view of the relative displacements in the transverse direction is that which is created by the braking and return means, that is to say an arrangement which can be devised by the builder in any desired manner, for instance with a view to giving it the maximum of sensitiveness, contrary to what takes place when, as in known trucks, the load is transmitted to shoes bearing directly upon sliding tables of the truck.

According to the present invention, the braking device includes one or several dash-pots or hydraulic absorbers of the double action type, or one or several pairs of dashpots or hydraulic shock absorbers of the simple or double action type, these apparatus being advantageously associated with one or several elastic return devices, such as metallic springs, rubber springs, pneumatic cushions, and so on. As for the means for reducing the friction, they may very simply include one or several roller, needle, or ball bearings, or the like, adapted to permit an easy displacement in the transverse direction.

The invention includes a particular braking system, which is chiefly intended to ensure, in a vehicle, the result above mentioned, and which is characterized by the following arrangement: the element to be braked (for instance the king pin of a truck) is connected, in its displacements in a predetermined direction, to a sliding member which is maintained between springs and is rigid with the respective pistons of two dashpots or hydraulic shock absorbers located on either side of this sliding member, the whole being mounted in a tubular box (cylindrical or prismatic) extending in the direction in question, in such manner that this box, together with its fittings, can be inserted through one end, as a whole, or, under the same conditions can be mounted element by element, taken to pieces, examined or adjusted. Abutments are preferably combined with the elements above mentioned so as to limit the transverse displacements of the member to be braked to a predetermined value.

This braking system may be applied either to a king-pin accompanying the movements of the frame of the vehicle or body with respect to the truck or to a pin or equivalent member accompanying the movements of the truck. In the first case, the braking system is carried by the truck. Preferably, the king-pin is connected to the sliding member through spherical bearing surfaces, for instance a spherical socket joint which the pin engages with a possibility of vertical displacements.

In particular the tubular casing containing the system for braking the transverse displacements may be mounted in the transverse tubular element of the flexible truck above described, or this transverse member itself may constitute the casing of said braking system.

In another embodiment of the present invention or in a more specific form of the embodiment just above described, the vehicle rests upon the truck through bearing devices which include a shoe capable of moving with friction with respect to the truck or with respect to the body or chassis of the vehicle, a roller track permitting a relative displacement in the transverse direction, without this displacement being braked by the friction of the shoes, and finally a return device for urging the truck and the body or chassis of the vehicle to a predetermined relative position in the transverse direction. Owing to this arrangement, relative displacements take place practically under the sole control of the return device whereas the relative displacements which imply a rotation of the truck with respect to the body are braked by the friction of the shoes, which friction is all the stronger as these shoes support the load of the vehicle.

Preferably, each shoe is caused to correspond to a rolling track interposed between said shoe and a bearing device including two pieces fitting in each other along spherical surfaces, the shoe being for instance guided in longitudinal slideways without any risk of wedging.

Other features of the present invention will result from the following detailed description of some specific embodiment thereof.

Preferred embodiments of the present invention will be hereinafter described, with reference to the accompanying drawings given merely by way of example, and in which:

Fig. 2 is a sectional view in a transverse plane of the vehicle, passing through the axis of the central transverse member of the pivot of a truck which is slightly different, in its construction, from the truck of Fig. 1;

Fig. 3 is a sectional view on the line III—III of Fig. 2;

Fig. 4 is a partial longitudinal section on the line IV—IV of Fig. 2;

Fig. 5 is a partial plan view corresponding to Fig. 2;

Fig. 6 shows, on an enlarged scale, a modification of the shock absorber shown in Fig. 2.

Figure 1:
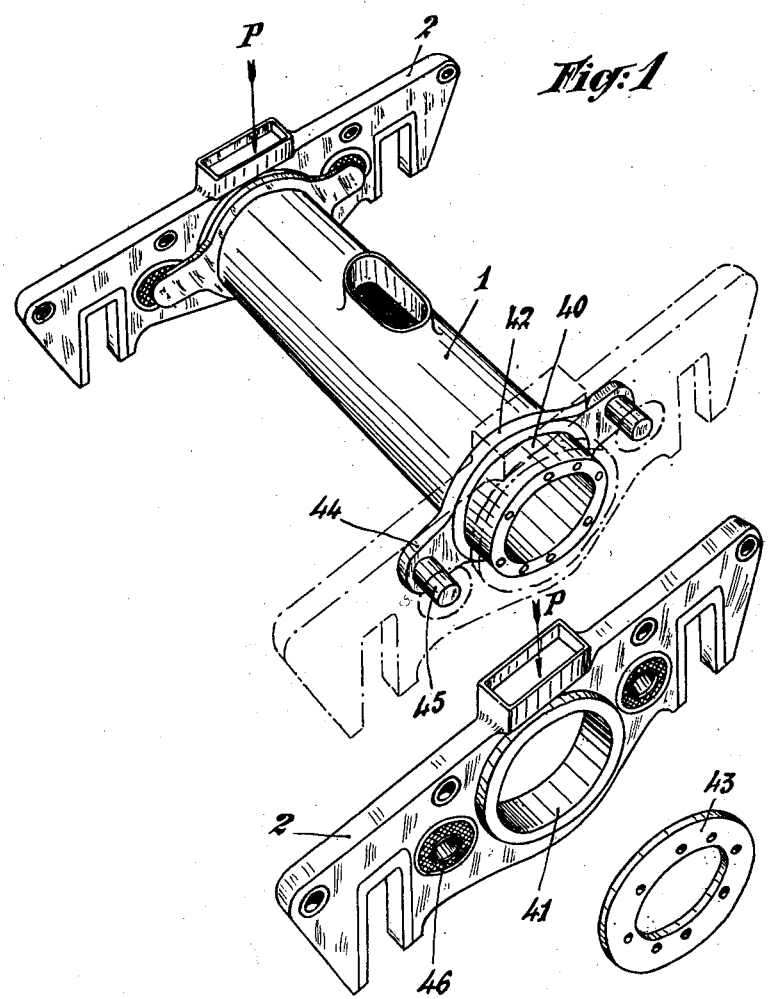
Fig. 1 is a perspective view of a flexible truck partly taken to pieces, this truck being made according to the invention.

In the embodiment of Fig. 1, the flexible truck includes, as essential elements, the two longitudinal members 2 and the transverse member 1. The latter, which is supposed to be of tubular shape in order to be able to receive internal members which will be hereinafter described (and which are not absolutely necessary) is provided with journals 40 adapted to engage bearings 41 of the longitudinal members. These longitudinal members are then maintained in the lateral direction between a stationary collar 42 and a removable collar 43. Transverse member 1 is provided with arms 44 provided themselves with pins 45 projecting into elastic sleeves 46, advantageously devised in the same manner as elements called "silent-blocks". The load of the vehicle is transmitted to the two longitudinal members in the directions of the arrows P, for instance through means which will be hereinafter described with reference to Figs. 2, 4 and 6. Of course, transverse member 1 might be rigidly fixed to one of the longitudinal members, the elastic sleeves corresponding to this longitudinal member then becoming unnecessary. These sleeves, which, in combination with pins 45, act as elastic return means, may be replaced by any means giving the same result (such for instance as metallic springs, torsion bars, etc.). In the drawings, I have shown by way of example, longitudinal members provided with jaws intended to act as guides for assembled axle boxes, but, of course, the arrangement might be different.

In the railway truck shown by Figs. 2 to 5, the transverse member 1 is constituted preferably of a piece of moulded steel, provided with an inner bore and including two horizontal faces, one at the top and the other at the bottom. The height of the beam thus formed is equal to the height of the longitudinal members of the truck, shown at 2. Gussets 3, disposed upon and under these horizontal faces, respectively, are fixed to longitudinal members 2 and transverse member 1 by riveting or bolting. It should be noted that, along a substantial portion of their length (distance between rivets 34 and the left edge of longitudinal members 2 on Fig. 2) the gussets are not in contact with the transverse member.

On the upper gussets 3 are fixed the slideways 4 which constitute guides for shoes 5. The latter are movable longitudinally in grooves 35 (Fig. 4) by sliding metal against metal. Slideways 4 may bear upon gussets 3 exclusively over the wings of longitudinal members 2 or they may extend slightly beyond the vertical planes limiting these wings. Shoes 5 themselves act as guides for swivel elements 6 which can move transversely on the shoes by rolling either on rollers provided with spindles or on cylindrical rollers 36 mounted in a cage 37, or again on balls movable in corresponding grooves. Swivel members 6 engage spherical cavities in supports 7 fixed to the longitudinal members 38 of the vehicle frame.

Assuming that the truck has pivoted relatively to the vehicle body about king-bolt 21, there is no possibility for swivel members 6 to be jammed with respect to shoes 5, nor for the latter to be jammed in slideways 4, while such undesirable event should occur if support 7 and swivel member 6 were combined into a unitary block.

The ends of transverse member 1 are fitted in holes provided in the longitudinal members through the intermediary of two annular pieces 8 fixed on said ends. These annular pieces 8 also serve for the fixation of the parts mounted inside said transverse member, which are:

The ends 9 and 10 of the shock absorbing cylinders;

The shock absorbing cylinders 11 and 12;

Cages 13, 14, 15, 16, containing coil springs and capable of acting as abutments for limiting the transverse displacements of the truck with respect to the body or inversely;

Coil springs 17 and 18;

Sleeve 20, swivel member 19.

In cylinders 11 and 12 are movably mounted pistons 22 and 23 rigid with rods 24 and 25. The latter are enclosed in sleeve 20, which is made of two parts, so as to permit the assembly of the parts. In the pistons 22 and 23, I provide one or several check valves 26 the springs of which are so chosen that the pressure in the extreme compartments of cylinders 11 and 12 cannot exceed a predetermined maximum. The ends of cylinders 11 and 12 are provided each with a hole for the passage of the respective rods 24 and 25. Fluid tightness is obtained by means of packing elements held by stuffing boxes 27, which can be adjusted from the outside by means of rods 28, extending through the cylinder ends 9 and 10. Small stuffing boxes 30 ensure fluid tightness of the cylinders on the outside.

Said rods 28 extend through pistons 22 and 23 and they are of variable section, so that the passage for oil flowing from one face of the piston to the opposite face is variable according to the position of said piston. The section of passage is maximum when the parts are in the middle position and it decreases gradually as the piston moves away from this position toward the outside.

By way of modification, the adjustment of the stuffing boxes 30 may be independent of rods 28. In this case the latter may be screw threaded and they can be screwed or unscrewed with respect to the cylinder ends 9 and 10, as shown by Fig. 6. This arrangement enables of varying from the outside the section of the passage available for oil, by axially moving rods 28, this displacement being made possible by the fact that these rods are screw-threaded. The adjustment of stuffing boxes 27 can be ensured by other rods 31 which extend also through the ends of cylinders 10 and 9, stuffing boxes 32 being provided at the points where the last mentioned rods extend through the cylinder ends.

Cylinders 11 and 12 are both connected to a tank 34 which is open to atmosphere through its filling orifice; the pipes from tank 34 to cylinders 11 and 12 open in the latter at points outside the stroke of pistons 22 and 23 so that the cylinders are permanently in open communication with the tank.

It will be assumed that, the truck moving suddenly toward the right hand side of Fig. 2 (as a result of the vehicle entering a curve) the chassis keeps moving in a straight line and pushes swivel 19 toward the left hand side, through the intermediary of king-pin or pivot 21. Swivel 19 drives sleeve 20 and rods 24 and 25, which transmit their displacements to pistons 22 and 23. Spring 18, located on the right hand side of the figure remains uninfluenced because its cage 15 abuts against a shoulder of the transverse member and its other cage 16 keeps in contact with the end of cylinder 12.

Spring 17, located on the left hand side of element 19, is compressed by its cage 14, which is directly subjected to the thrust of sleeve 20. On the other hand, swivel 19 compresses oil between end plate 9 and piston 22, through rod 24. Oil is driven out through the annular passages existing between piston 22 and rods 28 (the number of which may be 2, 3, 4, etc.) and these passages gradually grow smaller and smaller as piston 22 is moving toward end 9. The resistance to the movement of the piston in this direction is a function of the velocity and the amplitude of the displacements of the piston.

Meanwhile, the space available for oil in cylinder 11 has been slightly reduced since rod 24 is being driven like a plunger into said cylinder. Conversely the space available for oil in cylinder 12 has increased by the same amount, since rod 25 has moved out of cylinder 12 by the same length as rod 24 has moved into cylinder 11. In order that the necessary displacements of oil may be accomplished, the right hand side chamber of cylinder 11 is constantly connected to the left hand side chamber of cylinder 12 through pipe 33 (which, of course, might be arranged not to pass through reservoir 34 as shown, although remaining in communication therewith).

Like piston 22, piston 23 must overcome the resistance opposed to the flow of oil through the holes of piston 23. However, this resistance varies only with the velocity of translation of the piston because the section of rods 28 has a constant value as far as the end of cylinder 12 opposed to end face 19 and there is no shock absorbing effect in this direction. Check valves 26, provided in piston 22, open when the pressure reaches a value that would be dangerous for cylinder end 9.

When the force which has produced the displacement of these various parts is being balanced by spring 17 and the oil pressure, the latter suddenly drops since oil keeps flowing through the orifices. As the force keeps acting, the piston keeps moving and finally comes to a new position of equilibrium, until cages 13 and 14 come into contact with each other. At this time, the device acts as if the whole were rigid and piston 22 remains in position as long as the force in question has not decreased to such a degree as to be lower than the pressure of spring 17. From this time on, spring 17 brings back sleeve 20 toward the center, driving both of the pistons 22 and 23 together with itself. During this displacement, liquid flows back from cylinder 12 toward cylinder 11 without shock absorbing effect since the total volume is constant. The section of flow for the oil driven by piston 22 from the right hand side compartment of cylinder 11 toward the left hand side compartment thereof increases constantly until it reaches its maximum, whereas, for the oil driven by piston 23, the section of flow is constant and maximum.

The return to the middle position is therefore facilitated by spring 17, which expands, and by the fact that oil passes from one face to the other of piston 23 through orifices of constant section. The position of equilibrium, corresponding to the fact that cages 14 and 15 abut respectively against the respective shoulders provided in the bore of the transverse member is reached immediately or after only some short oscillations because if the middle position is overreached the resistance of spring 18 is brought into play and piston 23 plays in the opposite direction the same part as piston 22 played in the example above described.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a truck having a lateral motion damping device adapted to cooperate with a king bolt depending from the corresponding vehicle, the combination of a rigid tubular housing for said device, having an upper slot for accommodating the king bolt, the housing being open at both ends for mounting and dismounting said device; side frames arranged at right angles to the housing, provided with apertures for accommodating the open end portions of the housing; and means for assembling the housing and side frames into a truck frame having said housing as a transverse framing member.

2. In a truck, the combination of a transverse hollow framing member having an unobstructed bore extending throughout its length, and outer projections located solely in the middle part thereof; longitudinal framing members apertured to accommodate therein the end portions of the transverse framing member, transversely spaced apart from the outer projections on the transverse framing member; and means, including resiliently warpable metal plates attached in spanning relation to both the longitudinal framing members and the projections, for connecting the framing members together into a truck frame.

3. In a truck having a left lateral motion damping device and a right lateral motion damping device both adapted to cooperate with an intermediate king-bolt depending from the corresponding vehicle, the combination of a bolster having a bore extending throughout its length, with spaced apart internal abutments for said devices and an aperture in its wall opening into the bore between the abutments for accommodating the king-bolt; transversely spaced apart side framing members having apertures facing the open ends of the bolster; and means for connecting the bolster with the side framing members into a truck frame, including removable trunnions positioned in the side framing member apertures and each adapted to project into the corresponding bolster open end, to connect the same with the side framing member while forming an outer abutment for the corresponding lateral motion damping device.

ETTORE BUGATTI.